United States Patent
Kimura et al.

(10) Patent No.: US 7,646,928 B2
(45) Date of Patent: Jan. 12, 2010

(54) IMAGE DISPLAY CONTROL APPARATUS, IMAGE DISPLAY APPARATUS, IMAGE DISPLAYING METHOD AND PROGRAM THEREOF

(75) Inventors: Shunichi Kimura, Kanagawa (JP); Yutaka Koshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 881 days.

(21) Appl. No.: 11/074,784

(22) Filed: Mar. 9, 2005

(65) Prior Publication Data

US 2005/0271285 A1 Dec. 8, 2005

(30) Foreign Application Priority Data

Jun. 4, 2004 (JP) .......................... P2004-166626

(51) Int. Cl.
*G06K 9/36* (2006.01)

(52) U.S. Cl. .................. 382/233; 382/162; 382/166; 382/173

(58) Field of Classification Search ................ 382/233, 382/232, 240, 299, 162, 166, 181, 141, 104, 382/205, 144, 145, 173; 386/68; 348/423.1, 348/E5.035, E5.041; 345/100, 204; 375/E7.212, 375/240.12, 240.02, E7.076, E7.081, E7.04, 375/E7.129; 707/10, E7.032; 715/751; 714/752; 235/379; 396/233; 358/524; 318/596; 340/908.1, 340/919

See application file for complete search history.

(56) References Cited

U.S. PATENT DOCUMENTS

| | | | | |
|---|---|---|---|---|
| 4,805,134 A | * | 2/1989 | Calo et al. ..................... 707/10 |
| 5,127,063 A | * | 6/1992 | Nishiya et al. ............... 382/141 |
| 5,717,940 A | | 2/1998 | Peairs | |
| 5,764,658 A | * | 6/1998 | Sekiguchi et al. ...... 375/240.12 |
| 5,767,911 A | * | 6/1998 | Boon ..................... 375/240.12 |
| 5,903,904 A | | 5/1999 | Peairs | |
| 5,969,765 A | * | 10/1999 | Boon ..................... 375/240.12 |
| 5,999,219 A | * | 12/1999 | Boon ..................... 375/240.12 |
| 6,026,192 A | | 2/2000 | Maeda ....................... 382/232 |
| 6,067,320 A | | 5/2000 | Takahashi et al. | |

(Continued)

FOREIGN PATENT DOCUMENTS

JP A 06-004644 1/1994

(Continued)

OTHER PUBLICATIONS

Hibi, "Trend of Terminal Technology in Mobile Image Media," Journal of the Institute of Image Information and Television Engineers, Japan, The Institute of Image Information and Television Engineers, Oct. 20, 1997, vol. 51, No. 10, pp 1592-1599.

(Continued)

*Primary Examiner*—Anh Hong Do
(74) *Attorney, Agent, or Firm*—Oliff & Berridge, PLC

(57) ABSTRACT

An image display control apparatus for controlling a display to display an image on the basis of coded data of an input image encoded layer by layer in a plurality of layers, includes: a decoder that decodes coded data of parts of layers composing an input image to image data; and a controller that controls a display to display image elements on the basis of the image data decoded by the decoder.

7 Claims, 12 Drawing Sheets

U.S. PATENT DOCUMENTS

| | | | |
|---|---|---|---|
| 6,182,090 B1 | 1/2001 | Peairs | |
| 6,292,513 B1 | 9/2001 | Takahashi et al. | |
| 6,347,151 B1 | 2/2002 | Takahashi et al. | |
| 6,813,370 B1 * | 11/2004 | Arai | 382/104 |
| 6,859,612 B2 * | 2/2005 | Shida et al. | 386/68 |
| 6,902,105 B2 * | 6/2005 | Koakutsu | 235/379 |
| 7,062,080 B2 * | 6/2006 | Oshiumi et al. | 382/141 |
| 2002/0025081 A1 | 2/2002 | Kumazawa | |
| 2003/0126553 A1 | 7/2003 | Nagata | |

FOREIGN PATENT DOCUMENTS

| | | |
|---|---|---|
| JP | A-06-162163 | 6/1994 |
| JP | A-085011 | 3/1995 |
| JP | A 07-168927 | 7/1995 |
| JP | A-08-305731 | 11/1996 |
| JP | A 09-138805 | 5/1997 |
| JP | A-10-021043 (6-8) | 1/1998 |
| JP | A-10-154158 | 6/1998 |
| JP | A 10-198700 | 7/1998 |
| JP | A-2001-359095 (1-3) | 12/2001 |
| JP | A-2002-0563998 (5) | 2/2002 |
| JP | A-2002-182815 | 6/2002 |
| JP | A-2003-196270 (4) | 7/2003 |
| JP | A-2004-056761 | 2/2004 |

OTHER PUBLICATIONS

Kodama et al., "Study on Multimedia Proceedings and Its Image Intbrination Construction based on Scalability," Technical Research Report of the Institute of Electronics, Information and Communication Engineers, Jan. 24, 1997, vol. 96, No. 496, pp. 99-106.

Senda et al.. "A Method of Extraction of Character Patterns from a Color Image Based on the Uniformity of the Character Color or a String" Published by the Institute of Electronics, Information and Communication Engineers on Sep. 22, 1994, vol. 94, No. 242, pp. 17-24.

Japanese Office Action No. 2004-166626 dated Sep. 16, 2009 and the English-language translation.

* cited by examiner

FIG. 6

| AUTOMATIC REVISION AMOUNT (PAGES) | MANUAL REVISION AMOUNT (PAGES) | TOTAL REVISION AMOUNT (PAGES) |
|---|---|---|
| -5 | -1 | -6 |
| -5 | -2 | -7 |
| -5 | 0 | -5 |
| -5 | -1 | -6 |
| -5 | +1 | -4 |

DETERMINATION OF AUTOMATIC REVISION AMOUNT BASED ON THE STATISTICAL VALUE

IMAGE DISPLAY CONTROL APPARATUS, IMAGE DISPLAY APPARATUS, IMAGE DISPLAYING METHOD AND PROGRAM THEREOF

BACKGROUND OF THE INVENTION

1. Field of the Invention

The present invention relates to an image display apparatus for continuously displaying images corresponding to a plurality of pages included in an image file.

2. Description of the Related Art

For example, it is known to provide a file retrieval apparatus which carries out display at a high speed by reducing data volume to be displayed by aiming at only either one of document data or image data as a display subject. It is also known to provide a color electronic filing system which achieves high-speed retrieval by separating DC components and AC components through discrete cosine transform of image data, extracting only the DC components when retrieving, and decoding the same to simplify data processing. In addition, it is known to provide a display apparatus which achieves efficient information retrieval by enabling browsing only with respect to a designated area of parts of a screen. Further, it is known to provide an image retrieval apparatus which generates display data by thinning elongated image data series at fixed intervals, which are obtained by elongating compressed data.

SUMMARY OF THE INVENTION

The present invention has been made in view of the above circumstances and provide an image display apparatus for facilitating browsing of an image file consisting of a plurality of pages.

According to a first aspect of the invention, an image display control apparatus for controlling a display to display an image on the basis of coded data of an input image encoded layer by layer in a plurality of layers, includes: a decoder that decodes coded data of parts of layers composing an input image to image data; and a controller that controls a display to display image elements on the basis of the image data decoded by the decoder.

According to a second aspect of the invention, an image display control apparatus includes: a data extracting unit that extracts image data of parts of color components from an input image consisting of a plurality of color components; and a controller that controls a display to display an abstract image which reminds a user of the contents of the input image on the basis of the image data of parts of color components extracted from the data extracting unit.

According to a third aspect of the invention, an image display control apparatus includes: a density calculator that calculates a density of a character image area by area in respective part areas of an input image; a concentration value selecting unit that selects a concentration value area by area in the respective part areas in response to the density of the character image calculated by the density calculator; and a controller that controls a display to display an abstract image which reminds a user of the respective part areas by using the concentration values selected area by area in the respective part areas by the concentration value selecting unit.

According to a fourth aspect of the invention, an image display control apparatus includes: a coded volume calculator that calculates a coded volume of image data in respective part areas of an input image; a concentration value selecting unit that selects a concentration value area by area in the respective part areas in response to the coded volumes of part areas, which are calculated by the coded volume calculator; and a controller that controls a display to display an abstract image which reminds a user of respective part areas by using the concentration values selected area by area in the respective part areas by the density value selecting unit.

According to a fifth aspect of the invention, an image display control apparatus according to the invention includes: a part image selecting unit that selects character images, whose size is larger than a reference value, from character images included in an input image; and a controller that controls a display to display an abstract image which reminds a user of the contents of an input image by using the character images selected by the part image selecting unit.

According to a sixth aspect of the invention, an image display control apparatus according to the invention includes: a part image selecting unit that selects character images regulated as a title or heading on the basis of layout information of an input image; and a controller that controls a display to display an abstract image which reminds a user of the contents of the input image by using the character images selected by the part image selecting unit.

According to a seventh aspect of the invention, an image display control apparatus includes: a part image selecting unit that selects parts of pages of an electronic document as part images in an electronic document consisting of a plurality of pages composed of a plurality of input images; and a controller that controls a display to display an abstract image which reminds a user of the contents of the electronic document by using part images selected by the part image selecting unit.

According to a eighth aspect of the invention, an image display control apparatus for controlling a display to display images on the basis of an electronic document consisting of a plurality of pages, which includes: a partial data extracting unit that extracts, page by page, parts of partial data from a plurality of partial data generated by carrying out frequency division and bit plane division with respect to respective pages of an electronic document; and a controller that controls a display to continuously display abstract images which reminds a user of respective pages of the electronic document while changing pages, on the basis of the partial data extracted page by page by the partial data extracting unit.

According to an ninth aspect of the invention, an image display control apparatus for controlling a display to display images on the basis of an electronic document consisting of a plurality of pages, includes: a partial data extracting unit that extracts, page by page, coded data corresponding to partial data which composes an electronic document, from coded data of the electronic document; a decoder that decodes coded data extracted by the partial data extracting unit to partial data; and a controller that controls a display to continuously display abstract images which reminds a user of respective pages of the electronic document, while changing pages, on the basis of the partial data decoded by the decoder.

According to a tenth aspect of the invention, an image display controlling method for controlling a display to display images on the basis of coded data of an input image encoded in each of a plurality of layers, which includes: decoding image data of coded data in parts of layers which compose an input image and controlling a display to display image elements of the input image on the basis of the decoded image data.

According to a eleventh aspect of the invention, a program for causing a computer of an image display control apparatus for controlling a display to display images on the basis of coded data of an input image encoded in each of a plurality of layers to execute, includes decoding image data of coded data in parts of layers which compose an input image and controlling a display to display image elements of the input image on the basis of the decoded image data in the image display apparatus for displaying images on the basis of coded data of an input image encoded in each of a plurality of layers.

According to a twelfth aspect of the invention, a program for causing a computer of an image display control apparatus for controlling a display to display images on the basis of coded data of an input image encoded in each of a plurality of layers to execute, includes: extracting, page by page, coded data corresponding to partial data which composes an electronic document, from coded data of the electronic document; decoding the extracted coded data to partial data; and controlling a display to continuously display abstract images which reminds a user of respective pages of the electronic document, while changing pages, on the basis of the decoded partial data.

According to a thirteen aspect of the invention, an image display apparatus for displaying an image based on coded data of an input image encoded layer by layer in a plurality of layers, includes: a decoder that decodes coded data of parts of layers composing an input image to image data; and a display that displays image elements on the basis of the image data decoded by the decoder.

According to a fourteenth aspect of the invention, an image display apparatus for displaying images on the basis of an electronic document consisting of a plurality of pages, includes: a partial data extracting unit that extracts, page by page, coded data corresponding to partial data which composes an electronic document, from coded data of the electronic document; a decoder that decodes coded data extracted by the partial data extracting unit to partial data; and a display that continuously displays abstract images which reminds a user of respective pages of the electronic document, while changing pages, on the basis of the partial data decoded by the decoder.

BRIEF DESCRIPTION OF THE DRAWINGS

Embodiments of the present invention will be described in detail based on the following figures, wherein:

FIG. 6 is a view showing a page revision history stored in a history DB 560;

FIG. 8A shows a pattern in which a coded amount for respective coded packets is added to the head of the coded data as address information, and FIG. 8B shows a pattern in which a coded amount of a coded packet is added to the head of respective coded packets as address information;

FIG. 9A shows partial data when respective pages of an electronic document are divided in terms of image area, and FIG. 9B shows partial data when the partial data shown in FIG. 9A are further divided in terms of frequency;

FIG. 10A shows areas of images in respective pages, and FIG. 10B shows an abstract image 902 prepared on the basis of the coded amounts of respective image areas;

FIG. 12A shows an abstract image 906 of an even-numbered page, and FIG. 12B shows an abstract image 906 of an odd-numbered page.

DETAILED DESCRIPTION OF THE PREFERRED EMBODIMENTS

Figure 1:
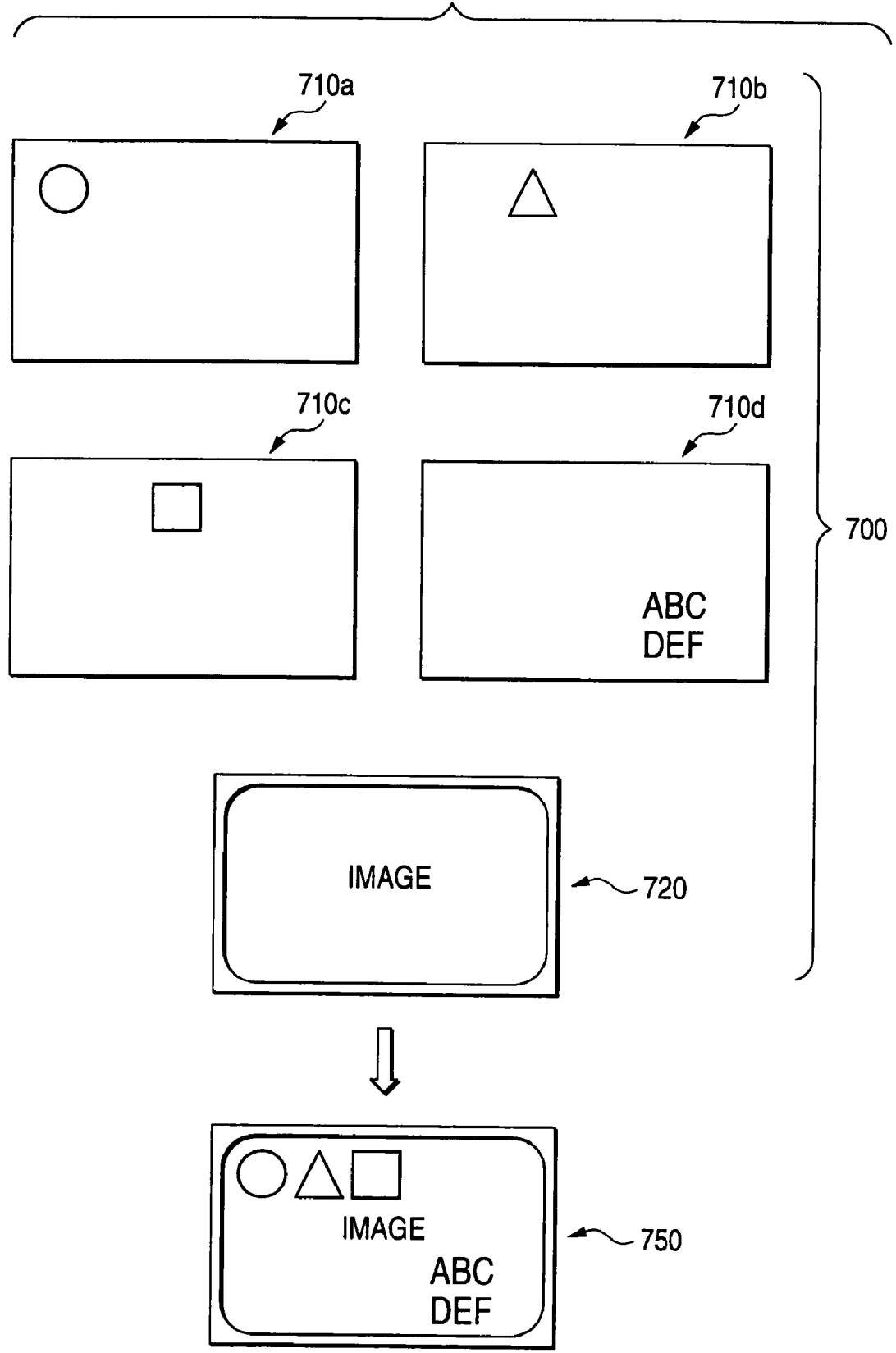
FIG. 1 is a view describing a layer structure of multi-mask system.

First, a description is given of the background in order to facilitate understanding of the invention.

In a case of finding out a desired page in a document (prepared with paper) such as a dictionary, etc., a user finds a desired page by visually checking respective pages (page numbers, titles, indexes, etc.) while leafing through the pages of the document at a high speed. Even in a case where an object to be retrieved is an electronized document (hereinafter called an "electronic document"), a user can retrieve a desired page in the electronic document at a high speed by applying page feeding as described above.

Further, in order to achieve high-speed and comfortable page retrieval, it is preferable that such a feature is provided, by which pages are automatically leafed one after another (hereinafter called an "automatic page feeding feature").

Herein, for example, when a person is seeking a desired page by leafing through a document, he or she does not always look at the entirety of an image in detail. Therefore, it is recommended that, when automatic page feeding is carried out in an electronic document, an image display apparatus does not display all the image data of an electronic document, but displays parts of the image data, whereby the displaying speed is improved.

Next, a description is given of image data used for the automatic page feeding.

The image data used for automatic page feeding are parts of image data of an electronic document (hereinafter called "partial data"). In order to make display of page images faster in the automatic page feeding, it is recommended that the display is made into as small a data volume as possible. In addition, in order that an abstract image is prepared on the basis of partial data and is continuously displayed, it is favorable that the partial data are those of displaying information which instantaneously reminds a user of the contents of respective pages.

For example, although it is considered that, when carrying out automatic page feeding, only characters or only images other than the characters are selected as partial data and displayed, in this case, improvement of the displaying speed cannot be achieved with respect to only an electronic document consisting of only characters or an electronic document consisting of images other than the characters.

Also, it is considered that only the DC components separated by discrete cosine transform are selected and displayed as the partial data. However, in this case, since the ratio of the data volume of the DC component is greater in comparison with entire codes, the displaying speed cannot be improved to the degree expected.

Therefore, an image display apparatus 2 according to the present embodiment displays only image elements allotted to parts of layers as an abstract image on the basis of image data of an electronic document composed of a layer structure. In this case, it becomes possible to flexibly select the contents to be displayed as an abstract image by varying the image elements allotted to layers.

There are mainly two types with respect to the method for managing images in terms of layer structure, one of which is a method for composing image data of an image layer to which multi-code image elements are allotted and at least one mask layer to which binary image elements are allotted (hereinafter called a "multi-mask system"), and the other of which is a MRC (Mixed Raster Content) method for composing image data of two or more image layers to which multi-code image elements are allotted and selection layers for selecting image elements outputted, image area by image area, from these image layers (hereinafter called an MRC system). Herein, layers such as the image layers and mask layer are overlapped with each other to compose one image, wherein relative positional relationships (overlapping positions, etc.,) are regulated in advance among a plurality of layers.

As described above, a compression system responsive to data characteristics (characteristics of changes in gradation) of image elements contained in respective layers may be applicable by managing images with those divided into a plurality of layers, wherein efficient compression is available. For example, with respect to the mask layer or selection layers composed of image elements (for example, an image whose possible gradation is binary), the number of possible gradations of which is a prearranged value or less, reversible run-length encoding compression or LZ coding compression, etc., may be applicable, and with respect to image layers composed of image elements (for example, an image whose gradation changes in 256 levels) whose number of possible gradation is greater than a prearranged value, non-reversible JPEG (Joint Photographic Coding Experts Group) compression may be applicable. Since the mask layers and selection layers, etc., are composed of images whose number of gradation is slight, a sufficiently high compression rate can be achieved even by reversible compression such as run-length encoding compression. Also, since image layers are composed of scan images, etc., the gradation of which quasi-continuously changes, image deterioration thereof does not become tangible even if non-reversible compression is carried out, wherein a high compression rate can be achieved.

FIG. 1 is a view describing a layer structure of a multi-mask system.

As shown in FIG. 1, image data 700 of a two-layered structure is composed of a plurality of mask layers 710*a* through 710*d* and one image layer 720.

The mask layer 710 is a layer to which image elements having slight changes in gradation (for example, 16 levels or less in gradation) such as character images or simple CG (Computer Graphics) images are allotted. Therefore, image elements contained in the respective mask layers 710 are composed of a single color and are expressed with two levels in gradation.

The image layer 720 is a layer to which image elements, whose number of gradation levels is greater than the gradation level of the mask layer 710, such as photograph images, etc., are allotted. For example, complicated CG images and continuous tone images are included in the image layer 720. Herein, the continuous tone images are images by which sufficiently continuous tone can be expressed in terms of visibility characteristics of humans, for example, those expressed by 16 levels or more in gradation per color.

A display image 750 is that displayed or printed on the image layer 720 by overlapping the mask layers 710*a* through 710*d* to each other in a predetermined sequence.

As described above, the image display apparatus 2 according to the embodiment selects and decodes coded data of parts of layers when execution of automatic page feeding is instructed when encoded data are acquired by the multi-mask system, the image elements allotted to the layers are displayed as an abstract image. It is preferable that the image display apparatus 2 selects, for example, a layer which reminds a user of the contents of the display image as in the layer (black mask layer) to which character images are allotted.

Figure 2:
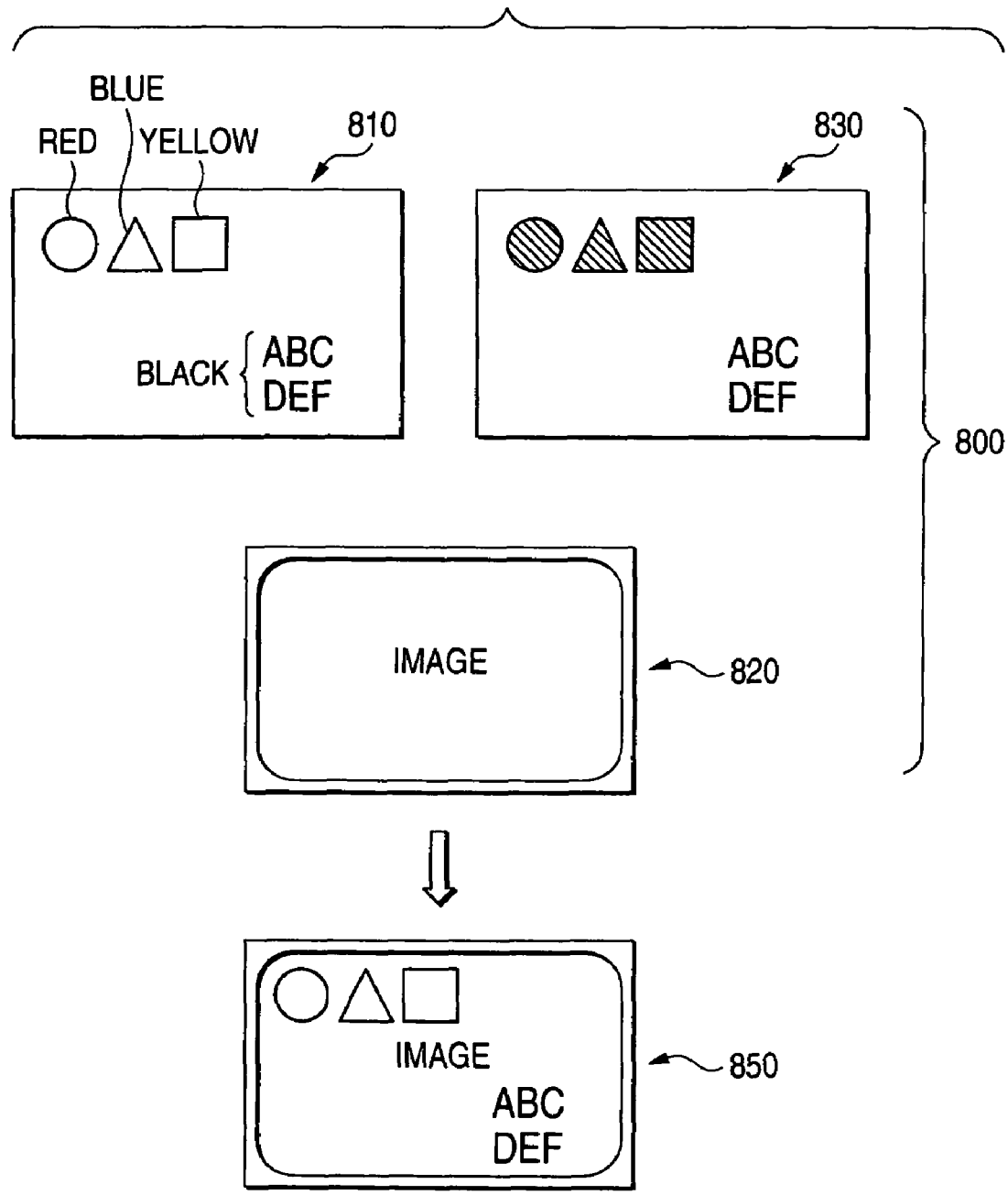
FIG. 2 is a view describing a layer structure of MRC system.

FIG. 2 is a view describing the layer structure of the MRC system.

Image data of the MRC system are composed of a plurality of image layers to which image elements to compose an image are allotted and selection layers for selecting image elements to be outputted, area by area in terms of image areas. In the present example, as shown in FIG. 2, image data 800 of a three-layered structure includes a foreground layer 810 and an image layer 820, which are provided as image layers, and further includes a selection layer 830 for selecting image elements from these layers.

A low gray-scale image such as a simple CG image or character image is allotted to the foreground layer 810. Also, the foreground layer 810 includes CG images or a plurality of color information contained in character images and halftone information.

Continuous tone images the number of gradation of which is greater than that of the foreground layer 810 are allotted to the image layer 820.

The selection layer 830 is composed of binary data showing which image elements in the foreground layer 810 or image layer 820 are outputted, area by area in terms of image areas (for example, pixel by pixel), and a pattern image is formed by the binary data. Black portions of the selection layer 830 in the example are pattern images for selecting image elements of the foreground layer 810, and the white portion is a pattern image for selecting image elements of the image layer 820.

A display image 850 is a displayed or printed image of image elements selected in response to the binary pattern contained in the selection layer 830 from the image elements contained in the foreground layer 810 and image layer 820.

As in the above case, the image display apparatus 2 according to the present embodiment selects and displays, as an abstract image, encoded data of parts of layers when execution of automatic page feeding is instructed when coded data encoded by the MRC system are acquired. The image display apparatus 2 may select, for example, any one of the layers or may select two layers including at least the selection layer 830.

Thereby, the image display apparatus 2 can display only either the picture image or character image as an abstract image by clearly extracting it, for example, even in a case where the picture image and character image are overlapped with each other. Also, the image display apparatus 2 can prepare and display various types of abstract images by changing allotment of image elements to respective layers.

Embodiment 1

Next, a description is given of an image display apparatus 2 according to Embodiment 1.

Figure 3:
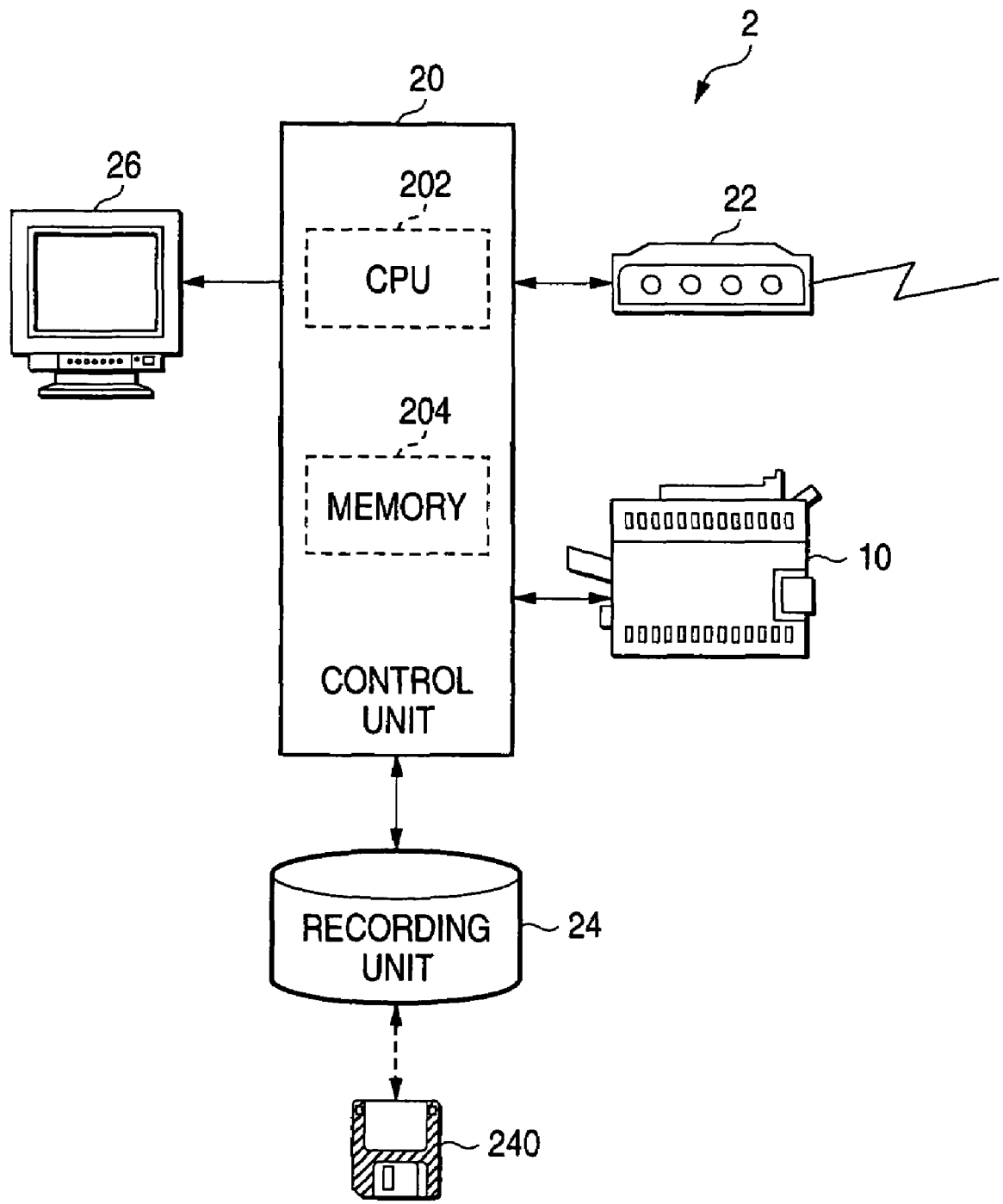
FIG. 3 is a view showing a hardware structure of an image display apparatus 2 according to the invention.

FIG. 3 is a view showing a hardware configuration of the image display apparatus 2 according to the invention.

As shown in FIG. 3, the image display apparatus 2 is composed of a control unit 20 including a CPU 202 and a memory 204, etc., a recorder unit 24 such as a communications unit 22, HDD/Counties, etc., and a user interface unit (UI unit) 26 including an LCD unit or CRT display unit and a keyboard/touch panel, etc.

For example, the image display apparatus 2 may be a universal computer, and is capable of requesting image printing or document image scanning to a printer unit 10 via a network.

[Browsing Program]

Figure 4:
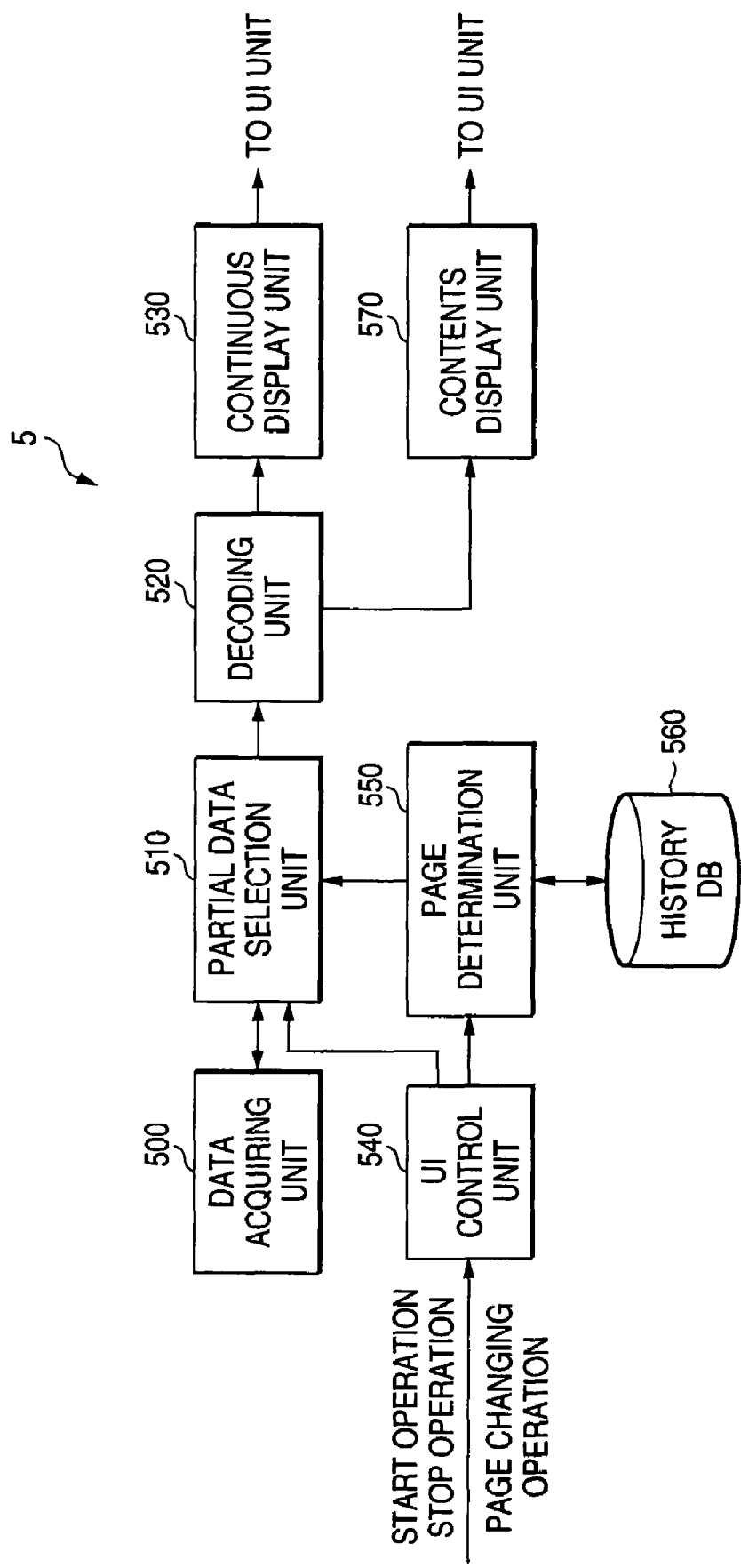
FIG. 4 is a view showing a configuration of a browsing program 5 which is executed by a control unit 20 (FIG. 2) and achieves an image displaying method according to the invention.

FIG. 4 is a view showing a configuration of a browsing program 5 which is executed by the control unit 20 (FIG. 2) and achieves an image displaying method according to the invention.

As shown in FIG. 4, a browsing program 5 includes a data acquiring unit 500, a partial data selection unit 510, a decoding unit 520, a continuous display unit 530, a UI control unit 540, a page determination unit 550, a history database (history DB) unit 560 and a contents display unit 570.

The browsing program 5 is provided to a control unit 20 via a recording medium 240 (FIG. 2) or a network, is loaded in the memory 204 and is executed.

In the browsing program 5, the data acquiring unit 500 acquires a data file of an electronic document, which becomes an object to be browsed, from the printer unit 10 (FIG. 3) or recording unit 24 (FIG. 3), etc. The data acquiring unit 500 of this example reads coded data of an electronic document consisting of a plurality of pages from the recording unit 24. Further, the data acquiring unit 500 may acquire a data file of an electronic document via a communications unit 22 (FIG. 3).

The partial data selection unit 510 selects parts of the data file page by page from the data files acquired by the data acquiring unit 500 and outputs the same to the decoding unit 520. For example, in the case where automatic page feeding is carried out, the partial data selection unit 510 selects parts of coded data (those allotted to layers, those divided by image areas, those divided by frequencies, and those divided by bit planes) page by page from the coded data of an electronic document and outputs the same to the decoding unit 520. And, in the case where automatic page feeding is stopped, the partial data selection unit 510 selects all coded data of pages to be displayed, from the coded data of an electronic document, and outputs the same to the decoding unit 520. Further, the partial data selection unit 510 of this example selects coded data of parts of layers from coded data of an electronic document composed of layer structure.

The decoding unit 520 decodes coded data inputted from the partial data selection unit 510 and outputs the same to the continuous display unit 530 or the contents display unit 570. For example, in the case where automatic page feeding is carried out, the decoding unit 520 decodes only parts of coded data (those selected by the partial data selection unit 510) with respect to respective pages of an electronic document and outputs the decoded data (partial data) to the continuous display unit 530, and in the case where automatic page feeding is stopped, the decoding unit 520 decodes all coded data of an electronic document or all coded data of a displayed page, and outputs the decoded data (all data) to the contents display unit 570.

In the case where execution of automatic page feeding is instructed, the continuous display unit 530 prepares abstract images, which remind a user of respective pages of an electronic document, on the basis of the partial data inputted from the decoding unit 520, and continuously displays the prepared abstract images in the UI unit 26 while feeding pages.

The UI control unit 540 outputs an instruction to the partial data selection unit 510 or the page determination unit 550 in response to an operation of a user upon receiving the operation from the user. For example, the UI control unit 540 gives an instruction of selecting partial data to the partial data selection unit 510 upon receiving an operation (a clicking operation of forward direction page feeding start button 264 or reverse direction page feeding start button 266, which are described later) for commencing automatic page feeding, and the UI control unit 540 commences automatic page feeding. Further, the UI control unit 540 gives a notice of timing, on which an operation is received, to the page determination unit 550 upon receiving the operation (a clicking operation of page feeding stop button 272 described later) of stopping the automatic page feeding, and gives an instruction of determination of a page to be displayed. Also, the UI control unit 540 gives an instruction of selecting all coded data of the instructed pages to the partial data selection unit 510 upon receiving an operation (a clicking operation of forward direction page leafing button 268 or reverse direction page leafing button 270, which are described later) of instructing so as to display a desired page.

In addition, upon receiving an automatic page feeding start operation or an automatic page feeding stop operation, the UI control unit 540 changes the functions of these operation areas to each other. That is, in the case where an operation of starting automatic page feeding is received, the UI control unit 540 changes the operation area where the operation is received to an operation area where an operation of stopping automatic page feeding is received, and when an operation of stopping automatic page feeding is received, the UI control unit changes the operation area where the operation is received to an operation area where an operation of starting automatic page feeding is received.

On the timing when having received an operation of stopping automatic page feeding, the page determination unit 550 determines a page to be displayed and gives an instruction of displaying the determined page to the partial data selection unit 510. In further detail, at the timing when having received an operation of stopping automatic page feeding, the page determination unit 550 determines the page moved only by a given automatic revision amount in the reverse direction of the direction of the automatic page feeding from a reference page as a page to be displayed, using the page corresponding to the abstract image (page image) displayed through the automatic page feeding (that is, by the continuous display unit 530) as the reference page.

The history DB 560 stores information regarding changes in pages, which will be carried out after stopping automatic page feeding, as a page revision history. The information regarding the page changes includes, for example, a page number (automatic revision amount) automatically revised by the page determination unit 550 and a page number (manual revision amount) manually revised by a user.

The page determination unit 550 determines an automatic revision amount on the basis of the page revision history stored in the above-described history DB 560. For example, the page determination unit 550 determines the average value of the immediately past page revision amount (sum of the automatic revision amount and the manual revision amount) or the most frequent value as an automatic revision amount. Also, the page determination unit 550 may determine the average value of the immediately last N page revision amounts (N is an integral number) or the most frequent value as an automatic revision amount.

Also, the page determination unit 550 may calculate the automatic revision amount whenever automatic page feeding stops or may calculate the automatic revision amount in the case where the automatic page feeding has been stopped by a predetermined number of times. In addition, the page determination unit 550 may calculate the automatic revision amount by prediction by, for example, a Kalman filter, etc., on the basis of the page revision history stored in the history DB 560.

Also, the page determination unit 550 may employ a prearranged fixed value as the automatic revision amount, not depending on the page revision history.

In the case where stopping of automatic page feeding is instructed, the contents display unit 570 causes an image of the page determined by the page determination unit 550 to be displayed in the UI unit 26 on all the data inputted from the decoding unit 520. Further, in the case where an instruction of displaying a desired page is instructed to a user (for example, in the case where the forward direction page leafing button 268 or the reverse direction page leafing button 270 is clicked), the contents display unit 570 causes the image of the page instructed to the user to be displayed in the UI unit 26 on the basis of all the data inputted from the decoding unit 520.

[User Interface]

Figure 5A:
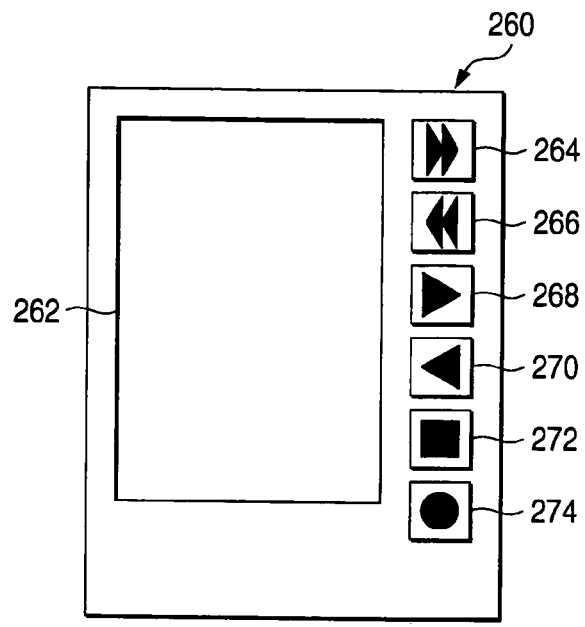
FIGS. 5A and 5B are views showing a display screen displayed by a UI unit 26.
Figure 5B:
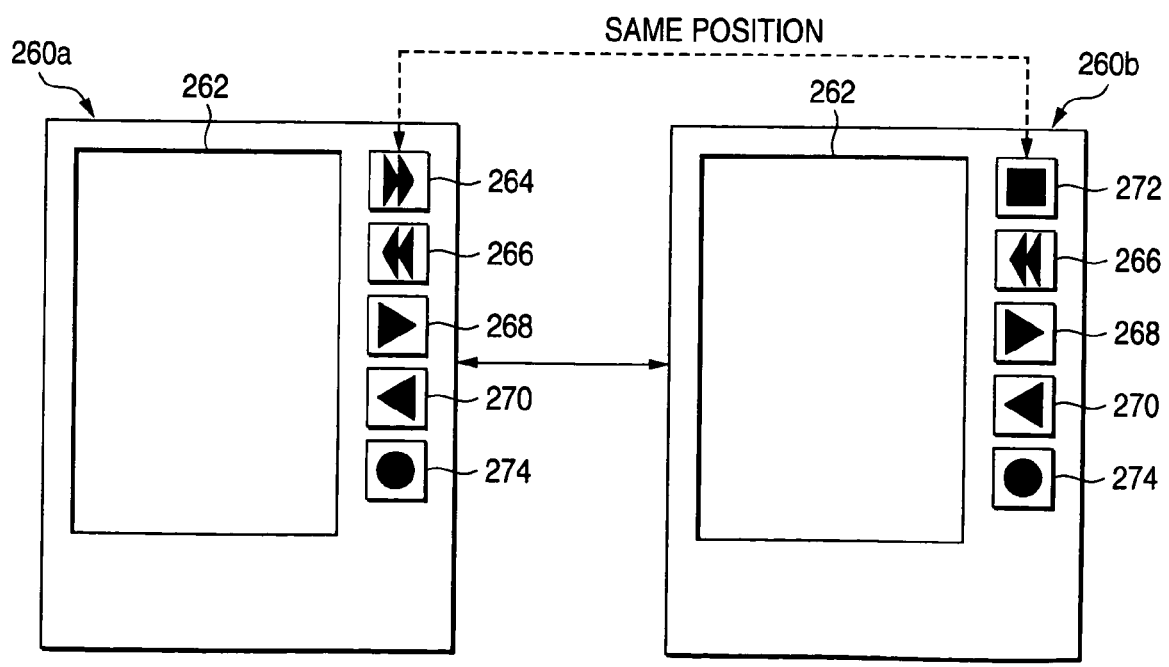

FIGS. 5A and 5B are views showing an image displayed by the UI unit 26.

In order to achieve an automatic page feeding feature with respect to an electronic document, as shown in FIG. 5A, a user interface for instructing start and stop of the automatic page feeding feature becomes necessary. In the present example, a forward direction page feeding start button 264 for starting automatic page feeding in the forward direction, a reverse direction page feeding start button 266 for starting automatic page feeding in the reverse direction, a forward direction page leafing button 268 for feeding pages in the forward direction page by page, a reverse direction page leafing button 270 for feeding pages in the reverse direction page by page, and a pager feeding stop button 272 for stopping automatic page feeding, etc., are provided in the display screen 260 in addition to the contents display unit 262 in which page images corresponding to respective pages of an electronic document are displayed.

For example, by clicking areas where these buttons are displayed, a user can start or stop the automatic page feeding. In the contents display unit 262, abstract images corresponding to respective pages of an electronic document are continuously displayed in response to a clicking operation of the user. Here, an abstract image is an image for which the data amount is suppressed to such a degree at which high-speed display is enabled.

In addition, it is possible for a user to change pages to be displayed, page by page by clicking the forward direction page leafing button 268 or the reverse direction page leafing button 270.

However, it is cumbersome to click a prescribed area by moving the pointer whenever starting or stopping automatic page feeding. Also, in the case where it is desired that automatic page feeding is stopped immediately after the automatic page feeding is started, it takes some time until moving the pointer from the display position of the forward direction page feeding start button 264 or the reverse direction page feeding start button 266 to the display position of the page feeding stop button 272 and making a clicking operation thereat, wherein there is a case where the automatic page feeding cannot be stopped at the desired timing.

Therefore, as shown in FIG. 5B, in the case where automatic page feeding is started by clicking the forward direction page feeding start button 264 or the reverse direction page feeding start button 266, the UI control unit 540 according to the present embodiment changes the page feeding start button (the forward direction page feeding start button 264 or the reverse direction page feeding start button 266) to the page feeding stop button 272. Further, in the case where the automatic page feeding is stopped by clicking the page feeding stop button 272, the UI control unit 540 changes the page feeding stop button 272 to the page feeding start button (the forward direction page feeding start button 264 or the reverse direction page feeding start button 266).

Thereby, a user can carry out a start operation or stop operation of the automatic page feeding without moving the pointer.

[Automatic Revision of Page]

Next, a description is given of automatic revision of a page, which is carried out by the page determination unit 550. As described above, even if the page feeding start button and the page feeding stop button are provided roughly at the same position, a time lag occurs due to the physiological response time of a user and response time of the image display apparatus 2 until page feeding is stopped since a desired page is displayed, wherein pages are fed to some degree until the page feeding is stopped. Further, although a user can revise the page to be displayed, by clicking the forward direction page leafing button 268 or the reverse direction page leafing button 270, the number of pages are fed until the page feeding is stopped in the case where page feeding is carried out at a high speed, and page revision becomes cumbersome.

Therefore, the page determination unit 550 according to the embodiment displays a page returned by a predetermined number of pages in the reverse direction of automatic page feeding on the basis of the page (reference page) displayed at timing when an operation corresponding to the page feeding stop button is detected.

FIG. 6 is a view showing a page revision history stored in the history DB 560.

As shown in FIG. 6, the history DB 560 stores, as a page revision history, a page number (automatic revision amount) automatically revised using a reference page as the reference and a page number (manual revision amount) manually revised by a user thereafter.

Manual revision is carried out by, for example, a user making a clicking operation with respect to the forward direction page leafing button 268 or the reverse direction page leafing button 270, and in the case where a desired page is found, a determination button 274 (FIG. 5A) is clicked.

The history DB 560 of this example stores page numbers changed from stopping of the automatic page feeding to clicking of the determination button 274 as a manual revision amount.

The page determination unit 550 statistically determines the automatic revision amount on the basis of the automatic revision amount and manual revision amount (that is, page revision history), which are thus stored in the history DB 560.

Thereby, since the page to be displayed is automatically determined, the manual revision amount which a user must revise can be reduced.

[Entire Operations]

Next, a description is given of the entire operations of the image display apparatus 2.

Figure 7:
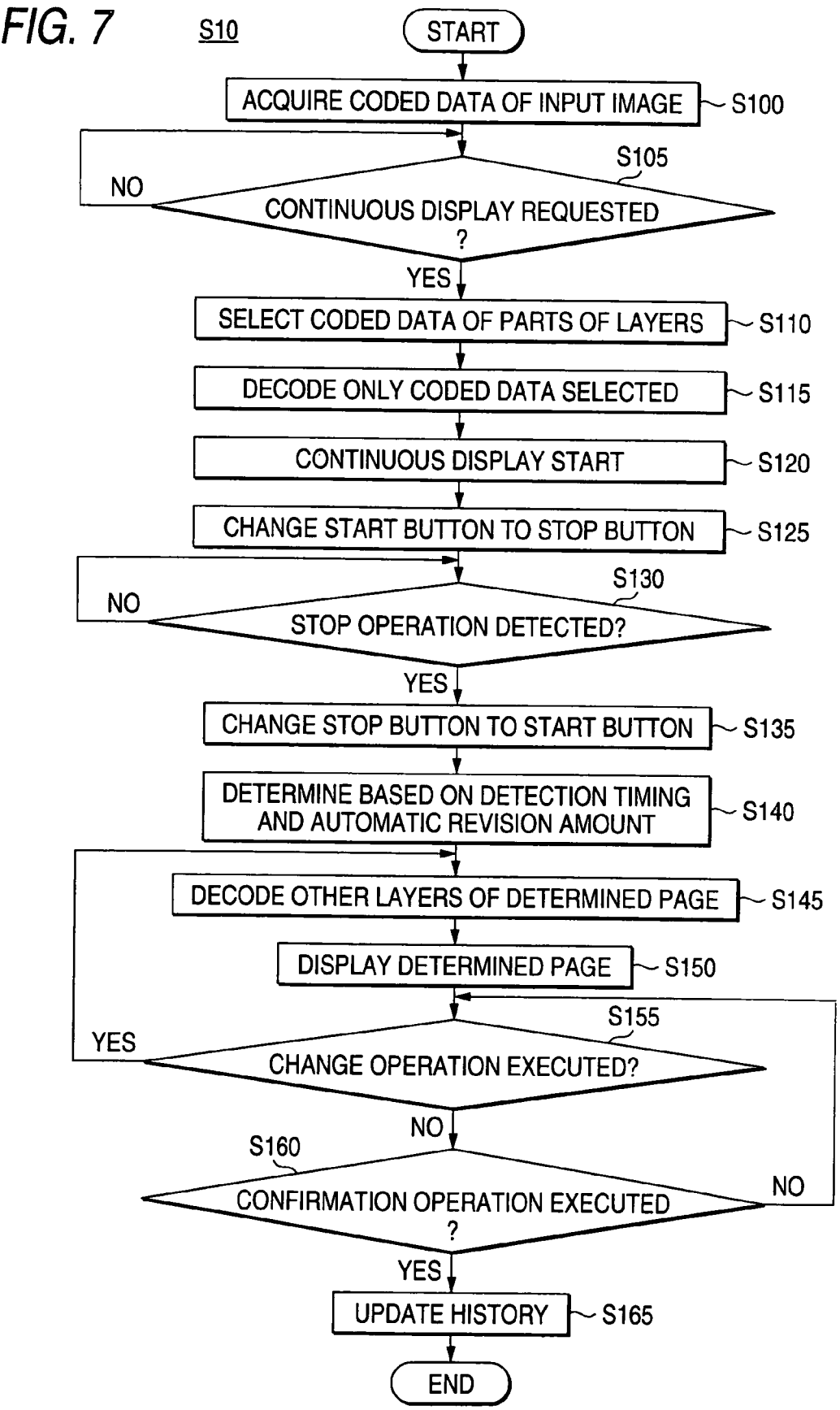
FIG. 7 is a flowchart showing operations (S10) of the browsing program 5.

FIG. 7 is a flow chart showing operations (S10) of the browsing program 5. Also, it is assumed that a case where image data encoded by the MRC system for convenience of the description are inputted is a detailed example.

As shown in FIG. 7, in Step 100 (S100), as a user selects an electronic document, which is an object to be browsed, by using the UI unit 26 (FIG. 3), the data acquiring unit 500 (FIG. 4) acquires coded data of the selected electronic document from the recording unit 24 (FIG. 3), etc.

In Step 105 (S105), the UI control unit 540 judges whether or not a start operation of automatic page feeding is carried out, and when the start operation of the automatic page feeding is carried out, the UI control unit 540 gives an instruction of automatic page feeding to the partial data selection unit 510.

The browsing program 5 shifts to the process of S110 where the start operation of automatic page feeding (the forward direction page feeding start button 264 or the reverse direction page feeding start button 266 has been clicked as shown in FIGS. 5A and 5B) has been made, and, in cases other than the above, waits until a start operation is carried.

In Step 110 (S110), the partial data selection unit 510 selects coded data of the selection layer 830 from the coded data (coded data encoded by the MRC system) acquired by the data acquiring unit 500 and outputs the selected coded data to the decoding unit 520.

In Step 115 (S115), the decoding unit 520 decodes the coded data (coded data of the selection layer 830) inputted from the partial data selection unit 510 and outputs the decoded data of the selection layer (that is, partial data) to the continuous display unit 530.

In Step 120 (S120), the continuous display unit 530 continuously displays images allotted to the selection layer of respective pages in the UI unit 26 (FIG. 3) on the basis of the data of the selection layer inputted by the decoding unit 520.

In Step 125 (S125), when automatic page feeding is started, the UI control unit 540 changes the operation area for receiving a start operation (that is, the forward direction page feeding start button 264 or the reverse direction page feeding start button 266, which is shown in FIGS. 5A and 5B) to the operation area for receiving a stop operation of the automatic page feeding (that is, the page feeding stop button 272 shown in FIGS. 5A and 5B).

In Step 130 (S130), a user seeks a desired page while looking at abstract images of respective pages continuously displayed by the automatic page feeding, and carries out a stop operation (a clicking operation of the page feeding stop button 272) of the automatic page feeding after confirming that an abstract image of the desired page is displayed.

The UI control unit 540 judges whether or not the stop operation of automatic page feeding has been carried out, and, in the case where the stop operation of automatic page feeding is executed, the UI control unit 540 gives an instruction of determining a page to be displayed to the page determination unit 550.

The browsing program 5 shifts to the process of S130 in the case where the stop operation of automatic page feeding has been executed (that is, a clicking operation of page feeding stop button 272 has been made), and, in cases other than the above, continues automatic page feeding until a stop operation is carried out.

In Step 135 (S135), the UI control unit 540 changes the operation area for receiving a stop operation (that is, the page feeding stop button 272 shown in FIG. 5A) to an operation area for receiving a start operation of automatic page feeding (that is, the forward direction page feeding start button 264 or the reverse direction page feeding start button 266, which is shown in FIG. 5B) when a stop operation of automatic page feeding has been carried out.

In Step 140 (S140), the page determination unit 550 determinates a page to be displayed, on the basis of timing, on which a stop operation of automatic page feeding is detected, and a predetermined automatic revision amount, and notifies the partial data selection unit 510 of the determined page.

In Step 145 (S145), the partial data selection unit 510 selects coded data of other layers (the foreground layer 810 and image layer 820) of the determined page, and outputs the coded data of the selected other layers to the decoding unit 520.

The decoding unit 520 decodes the coded data of the other layers selected, and outputs the data of the other layers selected (that is, the foreground layer 810 and the image layer 820) to the contents display unit 570 together with the data of the selection layer 830.

In Step 150 (S150), the contents display unit 570 displays the image of the page determined by the page determination unit 550 on the basis of the data inputted from the decoding unit 520 (that is, data of the foreground layer 810, image layer 820 and selection layer 830).

In Step 155 (S155), a user manually carries out an operation of changing a page (a clicking operation of the forward direction page leafing button 268 or the reverse direction page leafing button 270) in the case where the display page is not a desired page).

The UI control unit 540 judges whether or not an operation of manually changing pages has been carried out. In the case where a changing operation has been executed, the UI control unit 540 gives an instruction to the partial data selection unit 510 for the user to select coded data of a designated page, whereby the user is caused to display the image of the designated page in the contents display unit 570.

The browsing program 5 returns to the process of S145 in the case where a manually changing operation of pages (a clicking operation of the forward direction page leafing button 268 or the reverse direction page leafing button 270) is carried out, and displays the image of the designated page, and in the case where the manually changing operation of pages is not carried out, the program shifts to the process of S160.

In Step 160 (S160), a user carries out an operation for determining a page (a clicking operation of the determination button 274 (FIGS. 5A and 5B)) when the display page is a desired page.

The UI control unit 540 judges whether or not an operation of determining a page (a determination operation) has been carried out, and, in the case where the determination operation has been carried out, calculates manually changed page numbers (that is, manual revision amount) for the period from the time when automatic page feeding was stopped to the time when the determination operation was carried out, and outputs the calculated manual revision amount to the page determination unit 550.

The browsing program 5 shifts to the process of S165 in the case where a determination operation (a clicking operation of the determination button 274) has been carried out, and returns to the process of S155 in the case where the determination has not been carried out.

In Step 165 (S165), the page determination unit 550 outputs the inputted manual revision amount and the last automatic revision amount from the UI control unit 540 to the history DB 560 and updates the page revision history (FIG. 6).

As described above, the image display apparatus 2 according to the present embodiment decodes only the image elements allotted to parts of layers with respect to an electronic document composed of a layer structure in a case of carrying out automatic page feeding, and displays the decoded image elements as an abstract image, whereby the abstract image is displayed at a high speed and the automatic page feeding can be made faster.

Embodiment 2

Next, a description is given of a second embodiment.

The image display apparatus 2 according to the above-described first embodiment selects, as partial data, coded data of parts of layers from the coded data of an electronic document composed of a layer structure. However, the image display apparatus 2 according to the second embodiment accesses coded data corresponding to image data (that is, partial data) divided in terms of image area, frequency or bit plane, and selects coded data corresponding to desired partial data. In detail, the image display apparatus 2 encodes image data (partial data) divided on the basis of at least one of image area, frequency and bit plane, respectively, and prepares coded packets in which the coded data are, respectively, contained, and address information to access these coded packets. The address information is information by which access to desired coded data is achieved without decoding the coded data, for example, is a coded amount (data amount) contained in the respective coded packets.

In addition, a hardware configuration of the image display apparatus 2 according to the second embodiment and a function configuration of the browsing program 5 thereof are substantially the same as those of the first embodiment.

Figure 8A:
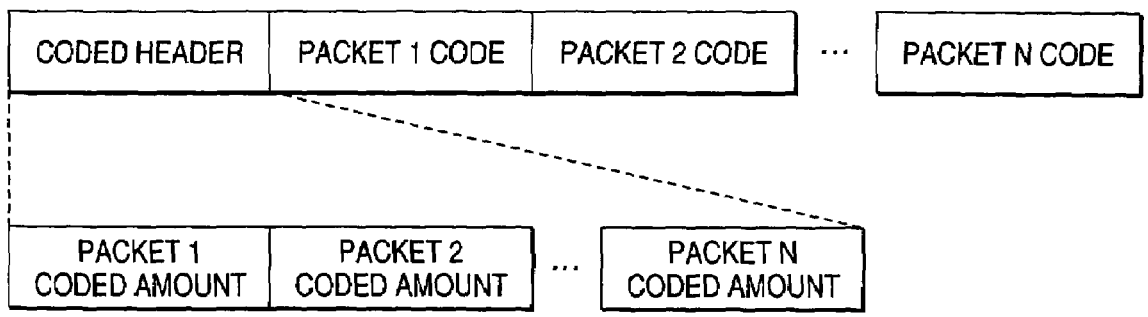
FIGS. 8A and 8B are views showing coded packets of an electronic document displayed by the image display apparatus 2.
Figure 8B:
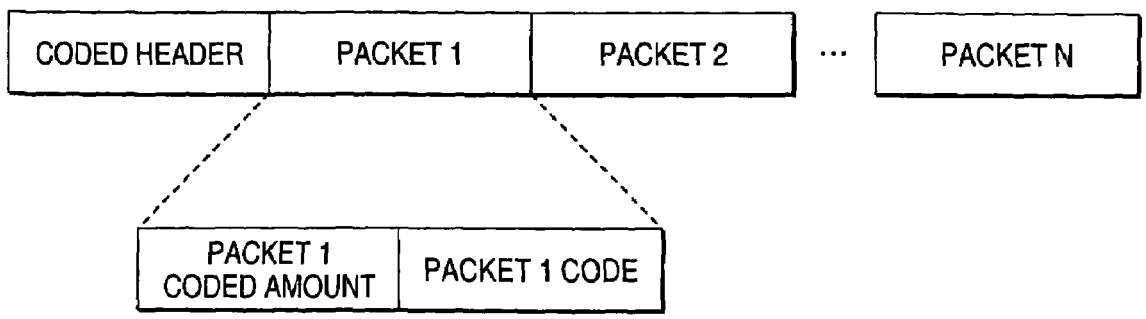

FIGS. 8A and 8B are views showing coded packets of an electronic document, which are displayed by the image display apparatus 2. FIG. 8A illustrates a pattern in which a coded amount for respective coded packets is added to the head of the coded data as address information, and FIG. 8B illustrates a pattern in which a coded amount of a coded packet is added to the head of respective coded packets as address information.

As shown in FIG. 8A, the coded data includes a coded header disposed at the top thereof and a plurality of coded packets coming after the coded header. These coded packets include coded data of respective partial data, and the coded header includes a coded amount of coded data contained in the respective coded packets.

Utilizing the coded amount contained in the coded header as address information, the partial data selection unit 510 (FIG. 4) according to the embodiment accesses parts of the coded packets and decodes only desired partial data.

Also, as shown in FIG. 8B, the coded data of partial data and coded amount of the coded data may be included not in the coded header but in the respective coded packets.

In this case, utilizing the coded amount contained in the respective coded packets as address information, the partial data selection unit 510 accesses parts of the coded packets and decodes only desired partial data.

Figure 9A:
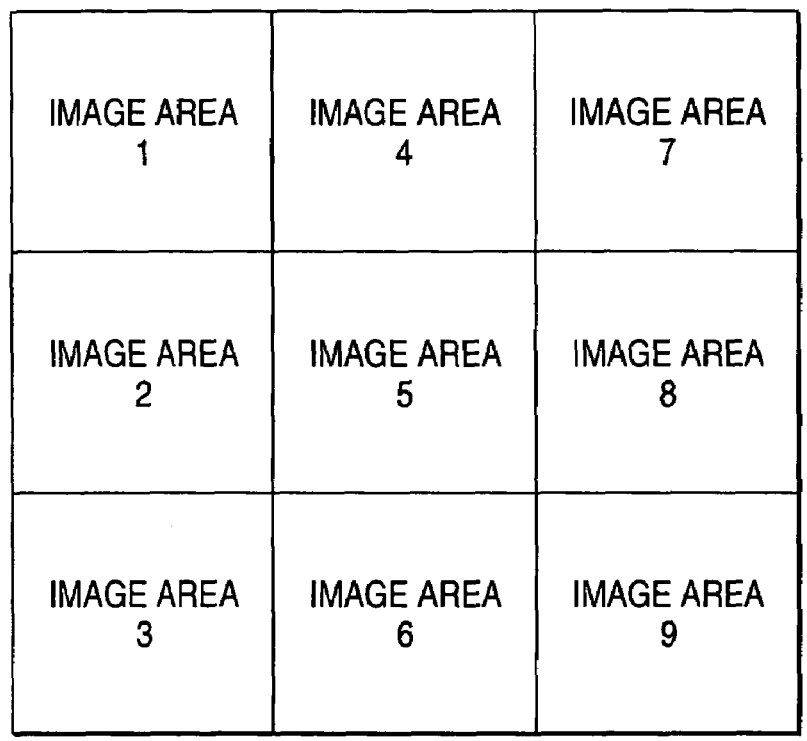
FIGS. 9A and 9B are views describing partial data contained in respective coded packets.
Figure 9B:
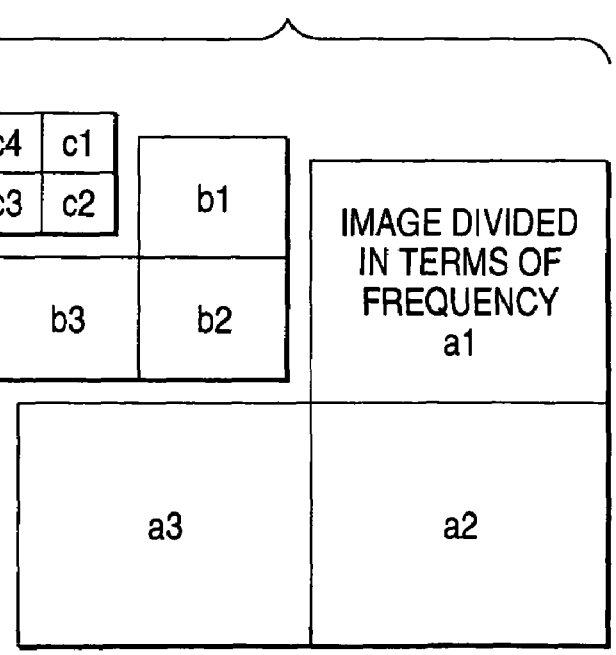

FIGS. 9A and 9B are views describing partial data contained in respective coded packets. FIG. 9A shows partial data in the case where respective pages of an electronic document are divided in terms of image area, and FIG. 9B shows partial data in the case where the partial data shown in FIG. 9A are further divided in terms of frequency.

As shown in FIG. 9A, the respective pages of an electronic document are divided into a plurality of image areas, wherein the divided image areas are encoded and are made into coded packets. In this case, the partial data selection unit 510 (FIG. 4) selects, page by page, only the coded packet corresponding to a desired image area, and outputs the same to the decoding unit 520, whereby the image display apparatus 2 decodes only the coded data of the desired image area in terms of respective pages of an electronic document and displays the image of the decoded image area as an abstract image. For example, the image display apparatus 2 decodes only the image area corresponding to a header portion or footer portion of a page and displays the same as and abstract image.

Therefore, the image display apparatus 2 is capable of decoding and displaying only the symbolic part of the respective pages, and is capable of not only deleting or reducing the data volume of a displayed image but also lowering the transfer volume of coded data transferred to the decoding unit 520, load of a decoding process made by the decoding unit 520 and transfer volume of the decoded image data.

Further, respective pages of an electronic document may be divided in terms of frequency. In this embodiment, partial data of respective image areas n are divided by wavelet transform in terms of frequency in the horizontal direction and vertical direction as shown in FIG. 9B. The partial data divided in terms of frequency are divided into partial images in a low frequency zone and partial images in a high frequency zone. Partial images in terms of frequency (a1 through a3, b1 through b3, and c1 through c4) shown in FIG. 9B are those in which wavelet transform is recursively applied to partial images in a low frequency zone and are made into sets of partial images in terms of a plurality of frequencies whose resolutions are different from each other. In this case, in the case where automatic page feeding is carried out, the partial data selection unit 510 (FIG. 4) selects coded data of frequency partial images corresponding to a desired resolution and outputs the same to the decoding unit 520. Thereby, the image display apparatus 2 is capable of preparing an abstract image with a necessary and sufficient resolution in the automatic page feeding and displaying the same.

Next, with reference to FIG. 7, a description is given of entire operations of the image display apparatus 2 according to the second embodiment. Also, in the following description, it is assumed, as a detailed example, that image data encoded in terms of JPEG2000 are inputted. Herein, image data encoded by JPEG2000 are those which are subjected to division in terms of image areas (tile division), division in terms of frequency (wavelet transform) and bit plane division. Respective partial data thereby divided can be optionally extracted by making a random access to coded packets, respectively. Therefore, the image display apparatus 2 can display image data of a desired image area at a desired image quality and resolution by directly accessing the coded packets.

As shown in FIG. 7, in S100, if a user selects an electronic document, which becomes an object to be browsed, using the UI unit 26 (FIG. 3), the data acquiring unit 500 (FIG. 4) acquires coded data (the coded data of JPEG2000) of the selected electronic document from the recording unit 24 (FIG. 3).

In S105, the UI control unit 540 judges whether or not a start operation of automatic page feeding is carried out, and, in the case where the start operation of automatic page feeding is carried out, the process advances to S110. In cases other than the above, the UI control unit 540 waits until a start operation is carried out.

In S110, the partial data selection unit 510 selects a coded packet from the coded data (coded data of JPEG2000) acquired by the data acquiring unit 500 in response to a desired image area (tile), resolution and image quality (SNR), and outputs the coded data of the selected coded packet to the decoding unit 520. That is, the partial data selection unit 510 outputs bit planes having high priority and respective coded packets thereof to the decoding unit 520.

In addition, the partial data selection unit 510 defines a specified area such as the header area or footer area of a page as an ROI (Region of Interest) and may select a coded packet so that the image quality of the specified area becomes higher than that in the other image areas.

In S115, the decoding unit 520 decodes coded data inputted by the partial data selection unit 510 and outputs the decoded partial data to the continuous display unit 530.

In S120, the continuous display unit 530 prepares abstract images of the respective pages on the basis of the partial data inputted by the decoding unit 520 and continuously displays the same in the UI unit 26 (FIG. 3).

In S125, when automatic page feeding is commenced, the UI control unit 540 changes an operation area for receiving a start operation to an operation area (the page feeding stop button 272 shown in FIG. 5A) for receiving a stop operation of automatic page feeding.

In S130, a user seeks a desired page while looking at abstract images of respective pages which are continuously displayed by automatic page feeding, and carries out a stop operation of the automatic page feeding when confirming that the abstract image of the desired page is displayed.

The UI control unit 540 judges whether or not a stop operation of automatic page feeding has been carried out. In the case where a stop operation of automatic page feeding has been carried out, the process shifts to S130. In cases other than the above, automatic page feeding is continued until a stop operation is executed.

In S135, when a stop operation of automatic page feeding is carried out, the UI control unit 540 changes the operation area for receiving a stop operation to the operation area for receiving a start operation of automatic page feeding.

In S140, the page determination unit 550 determines a page to be displayed, on the basis of the timing, on which a stop operation of automatic page feeding is detected, and the predetermined automatic revision amount, and notifies the partial data selection unit 510 of the determined page.

In S145, the partial data selection unit 510 selects other coded packets of the determined page, and outputs the coded data contained in the other coded packets thus selected, to the decoding unit 520.

The decoding unit 520 decodes the coded data of the other coded packets selected, and outputs the decoded partial data to the contents display unit 570.

In S150, the contents display unit 570 displays the image of the page determined by the page determination unit 550 on the basis of the data (all the data of the selected page) inputted by the decoding unit 520.

In S155, a user manually carries out a change operation of pages in the case where the displayed page is not a desired page.

The UI control unit 540 judges whether or not a manual change operation of pages has been carried out. In the case where a manual change operation of pages has been carried out, the process returns to S145, and the UI control unit 540 displays the image of the designated page, and in the case where a manual change operation of pages has not been carried out, a process of S160 is executed.

In S160, a user carries out a determination operation of a page in the case where the displayed page is a desired page.

The UI control unit 540 judges whether or not an operation for determining a page (determination operation) has been carried out, and, in the case where the determination operation was carried out, the UI control unit 540 calculates manually changed page numbers (manual revision amount) for the period from the time when automatic page feeding was stopped to the time when the determination operation has been carried out, and outputs the manual revision amount thus calculated to the page determination unit 550.

The browsing program 5 shifts to a process of S165 in the case where a determination operation of a page has been carried out, and returns to a process of S155 in the case where a determination operation has not been carried out.

In S165, the page determination unit 550 outputs the manual revision amount inputted by the UI control unit 540 and the last automatic revision amount to the history DB 560 and updates the page revision history (FIG. 6).

As described above, an image display unit 2 according to the embodiment is composed so as to directly access coded packets of coded data corresponding to partial data, selects only parts of coded packets, decodes the same, and prepares and displays an abstract image on the basis of the decoded partial data, whereby it is possible to display only a desired image area at desired revolution and image quality while suppressing the decoded data amount to the minimum.

[Modified Version]

Next, a description is given of modified versions of the above-described first or second embodiment.

In the above-described embodiments, although the image display apparatus 2 extracts only the image data of parts of layers in the image data composed of a layer structure and prepares an abstract image, the invention is not limited thereto. For example, the image display apparatus 2 may extracts only parts of color components contained in image data of an electronic document and may prepare an abstract image. For example, the partial data selection unit 510 may select coded data corresponding to the image data of a brightness component from coded data of an electronic document, the decoding unit 520 may decode only the coded data corresponding to the brightness component, the continuous display unit 530 may prepare abstract images based on the image data of the decoded brightness component and may continuously display the abstract image page by page. In detail, the partial data selection unit 510 may select the image data of a brightness component after decoding the entire coded data. Also, in the case of coded data based on JPEG2000, the partial data selection unit 510 may select only the component image of the brightness component and may output the same to the decoding unit 520.

Further, the image display apparatus 2 may extract only color components, whose compression rate is the highest, among a plurality of color components contained in the image data of an electronic document, and may prepare an abstract image on the basis of the image data of the extracted color components, because there are many cases where color components having a high compression rate are significant and meaningful as image information.

Also, the image display apparatus 2 calculates the coded amount in every area contained in respective pages, and may prepare an abstract image using the concentration values corresponding to the calculated coded amount.

Figure 10A:
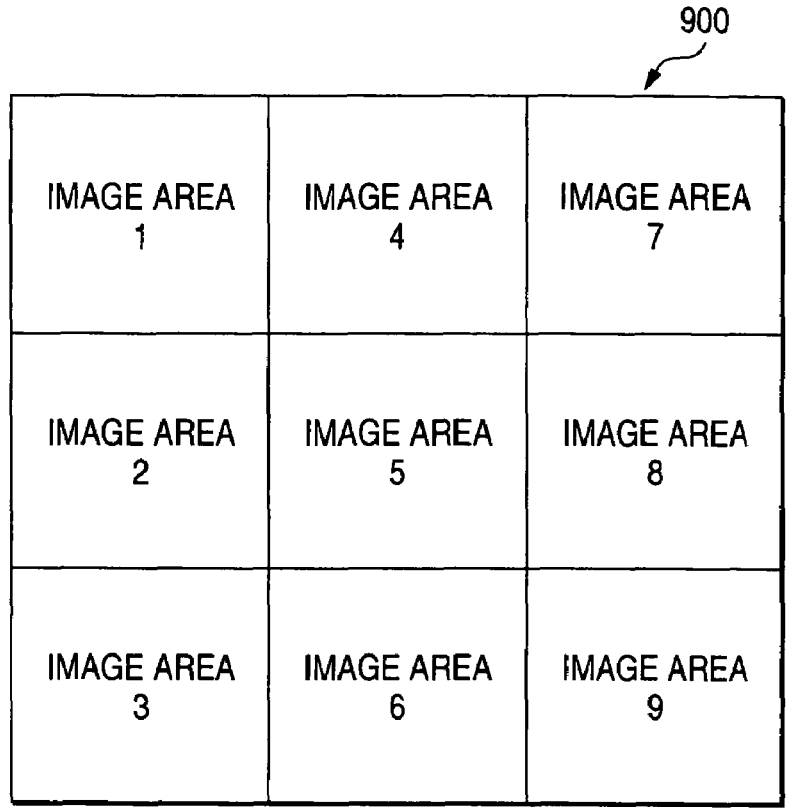
FIGS. 10A and 10B are views describing a method for preparing an abstract image 902 using the concentration values responsive to the coded amounts.
Figure 10B:
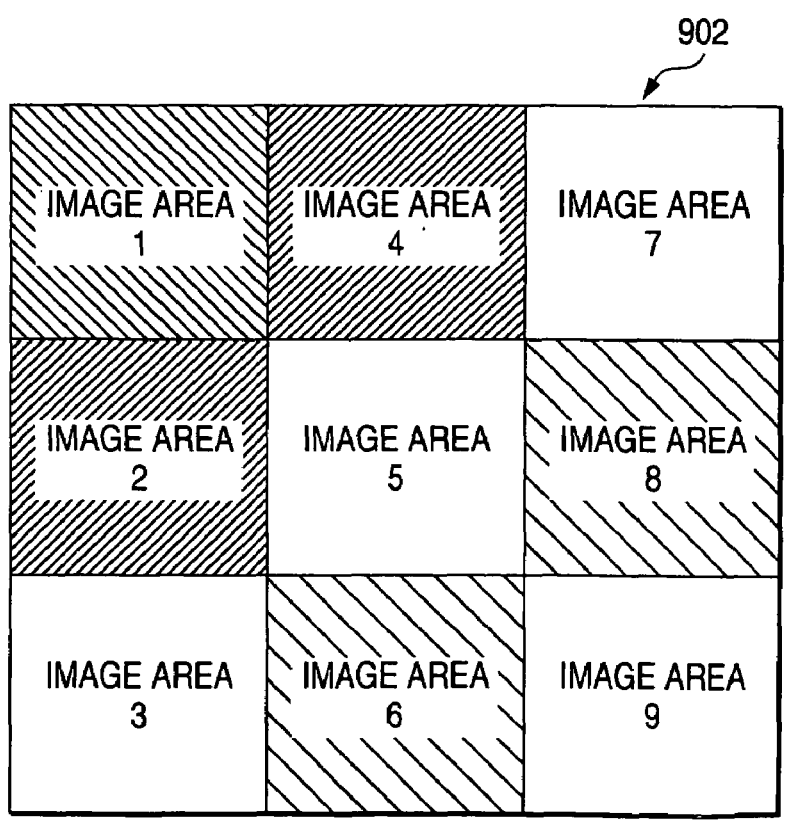

FIGS. 10A and 10B are views describing a method for preparing an abstract image 902 using the concentration values responsive to the coded amounts, wherein FIG. 10A shows areas of images in respective pages, and FIG. 10B shows an abstract image 902 prepared on the basis of the coded amounts of respective image areas.

As shown in FIG. 10A, the image display apparatus 2 calculates the coded amounts in every divided image area after dividing respective pages into a plurality of image areas (using the coded amount calculating unit). For example, as shown in FIGS. 8A and 8B, the coded amounts in every image area are calculated by adding up the coded amounts of coded packets corresponding to the respective image areas. The image display apparatus 2 determines the concentration values for respective image areas in response to the calculated coded amounts (using the concentration value selecting unit), and prepares an abstract image 902 shown in FIG. 10B by filling in the respective image areas at the determined concentration values.

For example, by allotting the higher the concentration value the more there are the coded amounts of the image areas, the image display apparatus 2 displays a complicated image area, in which images are intricate, at a high concentration value, thereby reminding a user of impressions of respective pages.

In this case, when automatic page feeding is carried out, the image display apparatus 2 can display abstract images at a high speed since it is not necessary to decode the coded data.

In addition, the image display unit 2 calculates the density of character images (number of character images, etc.) in every area contained in respective pages, and may prepare abstract images using the concentration value (concentration value selected by the concentration value selecting unit) corresponding to the calculated density. In this case, the image display apparatus 2 expresses an image area, in which character images are intricate at a high concentration value, as shown in FIG. 10B, and is able to remind a user of impressions of the respective pages. Also, the image display apparatus 2 selects colors in response to the coded amounts of the respective image areas or the density of the character images, and may prepare abstract images using the selected colors.

Further, the image display apparatus 2 extracts only greater character images (font images) than the reference value among the character images contained in respective pages, and may display only the extracted character images as abstract images.

Figure 11:
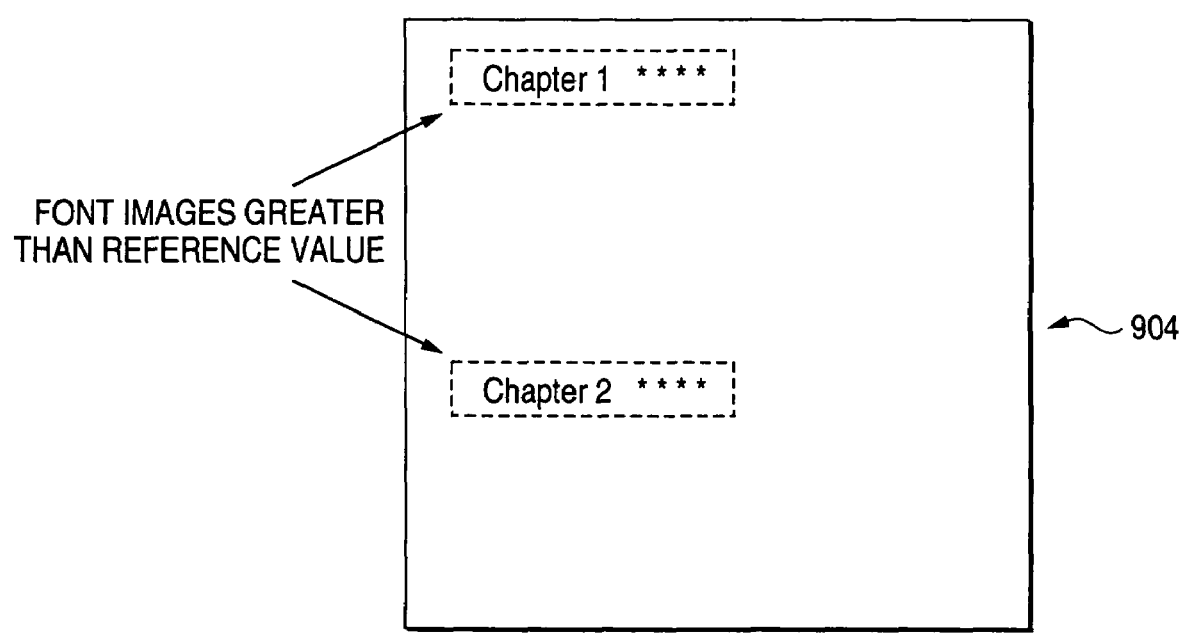
FIG. 11 is a view showing an abstract image 904 prepared on the basis of the size of character images.

FIG. 11 is a view showing an abstract image 904 prepared on the basis of the size of character images.

As shown in FIG. 11, the image display apparatus 2 extracts only greater character images than the reference value among character images contained in an electronic document (by the partial image selecting unit), and prepares an abstract image 904 with the extracted character images remaining as they are. The size of character images is specified by a character position recognizing process, for example, in cases where an electronic document is composed of raster data, and is specified by font size information such as a point number in cases where an electronic document is composed of PDL (Page Description Language).

Therefore, since characters such as titles are contained in an abstract image, it becomes easy to remind a user of the contents of respective pages.

Also, in the case where an electronic document is a structured document, the image display apparatus 2 extracts images such as titles or headings from an electronic document on the basis of tags (layout information) (by the partial image selecting unit) and may prepare abstract images using the extracted images.

Further, the image display apparatus 2 may make image areas to be decoded different from each other on the basis of odd-numbered pages and even-numbered pages. This is because, for example, in the case where an electronic document is a book, the positions of header and footer differ from each other in respective pages in respective odd-numbered pages and even-numbered pages.

Figure 12A:
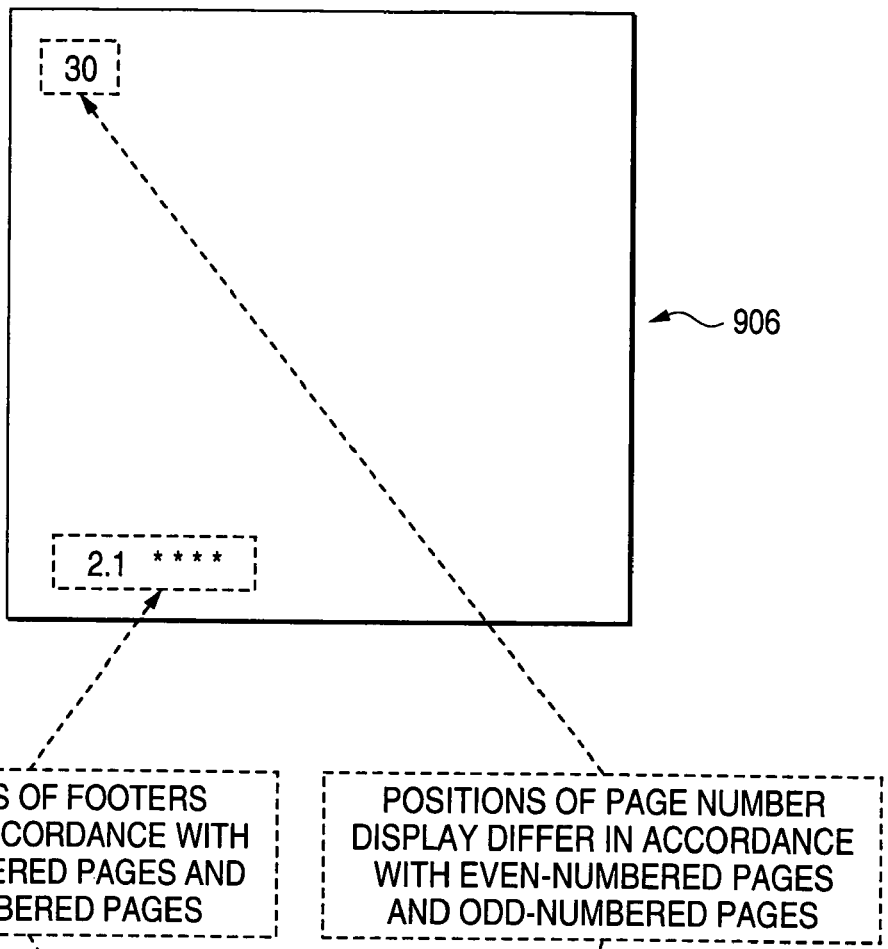
FIGS. 12A and 12B are views showing abstract images 906 prepared by applying image data of image areas which are different from each other in odd-numbered pages and even-numbered pages.
Figure 12B:
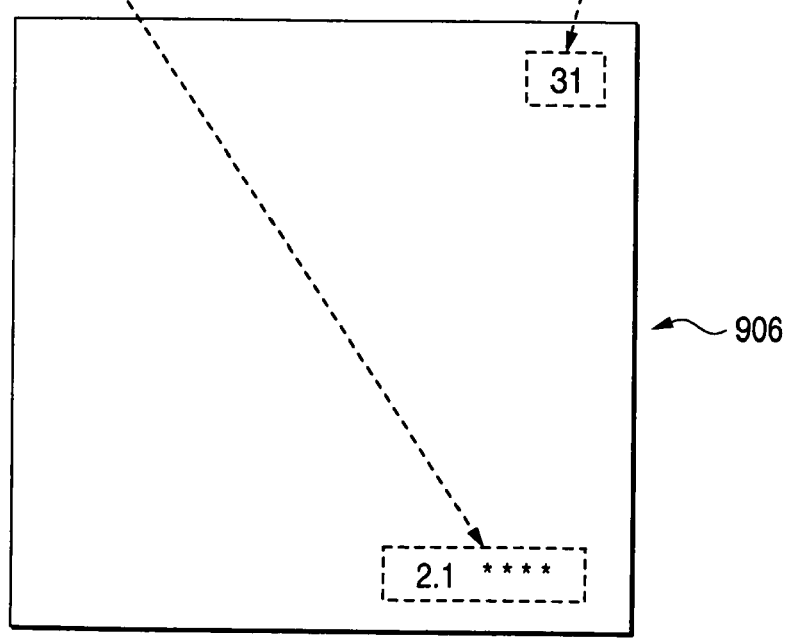

FIGS. 12A and 12B are views showing abstract images 906 prepared by applying image data of image areas which are different from each other in odd-numbered pages and even-numbered pages, wherein FIG. 12A shows an abstract image 906 of an even-numbered page, and FIG. 12B shows an abstract image 906 of an odd-numbered page.

As shown in FIG. 12A, in cases of preparing abstract images of even-numbered pages, the image display apparatus 2 selects coded data of image areas corresponding to even-numbered pages (by the partial image selecting unit) and decodes the same, and as shown in FIG. 12B, in cases of preparing abstract images of odd-numbered pages, the image display apparatus 2 selects coded data of image areas corresponding to odd-numbered pages (by the partial image selecting unit) and decodes the same. Image areas corresponding to even-numbered pages and image areas corresponding to odd-numbered pages are positioned to be, for example, symmetrical centering around the centerline of pages in the longitudinal direction.

Thus, the image display apparatus 2 selectively decodes specified image areas (displaying areas of page numbers, header areas and footer areas, etc.) corresponding to odd-numbered pages and even-numbered pages, respectively, and can display the same as abstract images.

Also, the image display apparatus 2 may continuously display only parts of pages, as abstract images, among a plurality of pages contained in an electronic document when automatic page feeding is instructed. For example, the partial data selection unit 510 (partial image selecting unit) selects pages, page by page, once every N pages (when N is an integral number including and more than 2) among coded data of respective pages of an electronic document, and outputs the coded data of the selected page to the decoding unit 520, and the decoding unit 520 decodes these coded data. The continuous display unit 530 displays pages selected by the partial data selection unit 510 by turns based on the decoded image data. The number of pages selected may be increased or decreased in response to the speed of automatic page feeding. That is, the image display apparatus 2 increases the above value of N in line with an increase in the automatic page feeding speed.

Thereby, the image display apparatus 2 notifies a user of a flow of the contents contained in an electronic document while reducing the data amount to be processed.

In addition, the image display apparatus 2 may feed pages at a fixed speed in the case where automatic page feeding is carried out. However, it may gradually increase the page feeding speed since automatic page feeding is commenced. In detail, the continuous display unit 530 may gradually increase a changing speed (that is, page feeding speed) of abstract images corresponding to respective pages of an electronic document since automatic page feeding is commenced. In other words, the continuous display unit 530 slowly feeds pages immediately after automatic page feeding is commenced, whereby a user can change pages by a single page by operations for starting or stopping the automatic page feeding.

Also, in the above-described embodiments, the image display apparatus 2 determines the manual revision amount using a determination operation of a page as reference (that is, a clicking operation of the determination button 274 shown in FIG. 5A). However, the invention is not limited thereto. For example, the number of changing pages for a predetermined period of time since stopping of automatic page feeding may be used as a manual revision amount, and the number of changing pages from the time when automatic page feeding is stopped to the time when the next automatic page feeding is commenced may be used as a manual revision amount.

What is claimed is:

1. An image display control apparatus comprising:
   a data extracting unit that extracts image data from an input image having a plurality of color components, the image data relating to parts of the color components contained within the input image; and
   a controller that controls a display to show an abstract image which reminds a user of contents of the input image on the basis of the image data extracted from the data extracting unit,
   wherein the data extracting unit extracts image data corresponding to brightness components from the input image, and
   the controller controls the display to display the abstract image on the basis of the image data of extracted brightness components.

2. An image display control apparatus comprising:
   a data extracting unit that extracts image data from an input image having a plurality of color components, the image data relating to parts of the color components contained within the input image; and
   a controller that controls a display to show an abstract image which reminds a user of contents of the input image on the basis of the image data extracted from the data extracting unit,
   wherein
   the data extracting unit extracts image data of color components whose compression rate is the highest, and
   the controller controls the display to display the abstract image on the basis of the image data of the extracted color components.

3. An image display control apparatus comprising:
   a density calculator that calculates a density of a character image by area in respective part areas of an input image;
   a concentration value selecting unit that selects a concentration value in the respective part areas in response to the density of the character image calculated by the density calculator; and
   a controller that controls a display to display an abstract image which reminds a user of the respective part areas by using the concentration values selected area by area in the respective part areas by the concentration value selecting unit.

4. An image display control apparatus comprising:
   a coded volume calculator that calculates a coded volume of image data in respective part areas of an input image;
   a concentration value selecting unit that selects a concentration value in respective part areas in response to the coded volumes of part areas, which are calculated by the coded volume calculator; and
   a controller that controls a display to display an abstract image which reminds a user of respective part areas by using the concentration values selected area by area in the respective part areas by the concentration value selecting unit.

5. An image display control apparatus for controlling a display to display images on the basis of an electronic document consisting of a plurality of pages, comprising:
   a partial data extracting unit that extracts, page by page, parts of partial data from a plurality of partial data generated by carrying out frequency division or bit plane division with respect to respective pages of an electronic document, and selects parts of the partial data from a plurality of coded data generated by carrying out image area division or frequency division with respect to respective pages of the electronic document; and
   a controller that controls a display to continuously display abstract images which reminds a user of respective pages of the electronic document while changing pages, on the basis of the partial data extracted page by page by the partial data extracting unit.

6. An image display control apparatus for controlling a display to display images on the basis of an electronic document consisting of a plurality of pages, comprising:
   a partial data extracting unit that extracts, page by page, parts of coded data from coded data of the electronic document, and selects parts of the partial data from a plurality of coded data generated by carrying out image area division or frequency division with respect to respective pages of the electronic document;
   a decoder that decodes coded data extracted by the partial data extracting unit to partial data; and
   a controller that controls a display to continuously display abstract images which reminds a user of respective pages of the electronic document, while changing pages, on the basis of the partial data decoded by the decoder.

7. An image display apparatus for displaying images on the basis of an electronic document consisting of a plurality of pages, comprising:
   a partial data extracting unit that extracts, page by page, parts of partial data from a plurality of partial data generated by carrying out frequency division or bit plane division with respect to respective pages of an electronic document, and selects parts of the partial data from a plurality of coded data generated by carrying out image area division or frequency division with respect to respective pages of the electronic document;
   a decoder that decodes coded data extracted by the partial data extracting unit to partial data; and
   a display that continuously displays abstract images which reminds a user of respective pages of the electronic document, while changing pages, on the basis of the partial data decoded by the decoder.

* * * * *